W. H. HARN.
MILL FOR CUTTING AND GRINDING VEGETABLES.
No. 12,278. Patented Jan. 23 1855.
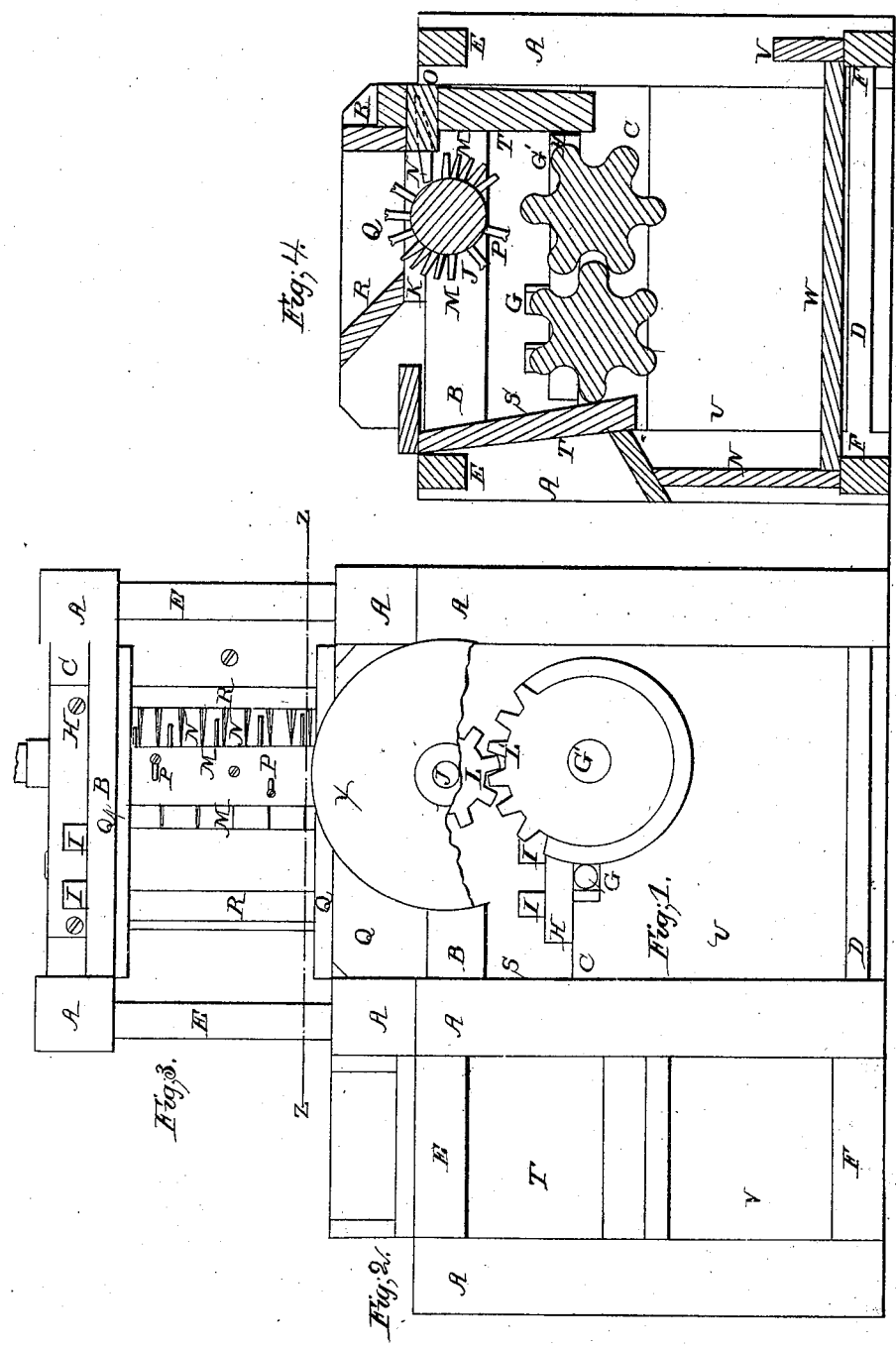

UNITED STATES PATENT OFFICE.

WILLIAM H. HARN, OF CARLISLE, PENNSYLVANIA.

MILL FOR CUTTING AND GRINDING VEGETABLES.

Specification of Letters Patent No. 12,278, dated January 23, 1855.

*To all whom it may concern:*

Be it known that I, WILLIAM H. HARN, of Carlisle, in the county of Cumberland and State of Pennsylvania, have invented a new and useful Mill for Cutting, Crushing, and Grinding Fruit, Vegetables, &c.; and I do hereby declare that the same is described and represented in the following specification and drawings.

The nature of my invention consists in a cylinder with a series of knives or pins so arranged that when the cylinder is turned the knives or pins pass between a series of stationary knives so as to slice the fruit and let it fall so as to drop on and pass between two nuts or fluted grinding cylinders which crush or grind it as desired, and if knives are used on the first cylinder I set a number of pins between them so as to clear the series of stationary knives so that there will be no opportunity for the mill to clog as it might do without them.

By uniting a slicing or cutting apparatus with a crushing and grinding apparatus I am enabled to make a very cheap mill that will grind faster, with less power than any mill heretofore made.

To enable others skilled in the art to make and use my invention, I will proceed to describe its construction and operation, referring to the drawings above mentioned, in which the same letters indicate like parts in each of the figures.

Figure 1, is an elevation of the mill with a plan of one end (Fig. 2,) and a plan of the top Fig. 3, connected with it. Fig. 4, is a section through the line *z z* of Fig. 3.

In the accompanying drawings A A are posts connected together by the girders B C and D, and the bars E E and F F framed into them in the usual manner or otherwise. I make scores in the girders C C for the journals of the fluted cylinders G G' which journals are secured by the cap H and the cylinder G may be set in either to, or from the other (by the keys I I which pass through the cap H and girder C) so as to grind coarse or fine as desired. I make scores in the girders B for the journals of the cylinder J which is secured by the cap K. This cylinder J has a pinion L upon it which is turned by the gear L' on the cylinder G' which cylinder may be turned by a gear pulley or crank applied to the opposite end from the gear L'. The cylinder J is provided with two rows of knives M M set spirally across it which knives pass down between the knives N fastened into the bar O, which bar is secured to the top of the frame. The pins P P are set in the cylinder J so as to pass down between the knives N so as to insure them to be kept clear and to carry down the fruit, etc., sliced by the knives onto the fluted cyllinders. I construct a hopper around the cylinder J with two sides Q Q and ends R R as represented; and also make a box or case around the cylinders G G' with the sides S S and ends T T also a box below to receive the fruit etc. ground with sides U and ends V V and bottom W. There is a fly wheel X represented on the end of the shaft of the cylinder J outside of the pinion L to equalize the motion.

The mill having been constructed and completed as above described, the fruit or other articles to be ground are put into the hopper in contact with cylinder J and the mill is set in motion and the knives in the cylinder will press the fruit against the stationary knives so that it will be sliced more or less by one or the other set of knives and the pins in the cylinder J will press some of the fruit down between the stationary knives so as to aid the knives in the cylinder in conveying the sliced fruit onto the rollers G G' which crush it (with far less power after it is sliced than they would do if it were not sliced) and the ground fruit is deposited on the bottom W of the lower box ready for further use.

I contemplate that the cylinder J may be set with pins only to press the fruit through between the stationary knives or that a series of stationary pins may be used instead of the stationary knives; and that numerous changes may be made in the construction of various parts of the mill without departing from the principles of my invention; and also that it may be used for cutting and breaking vegetables to feed stock by setting the fluted cylinders a sufficient distance apart.

What I claim as my invention and desire to secure by Letters Patent is:

A slicing or cutting apparatus consisting of a cylinder armed with knives and working in connection with stationary knives substantially as described in combination with a crushing or grinding apparatus substantially such as is herein described or the equivalent thereof; the whole being so constructed as to slice the fruit or vegetables and then crush or grind them in the same machine as described.

In testimony whereof, I have hereunto signed my name before two subscribing witnesses.

WILLIAM H. HARN.

Witnesses:
I. DENNIS, Jr.,
B. K. MORSELL.